US 10,704,343 B2

United States Patent
Park et al.

(10) Patent No.: US 10,704,343 B2
(45) Date of Patent: Jul. 7, 2020

(54) LAUNCHING AND RETRIEVING WIRELINE EAT SENSORS

(71) Applicant: Halliburton Energy Services, Inc., Houston, TX (US)

(72) Inventors: Brian V. Park, Austin, TX (US); Mikko Jaaskelainen, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 16 days.

(21) Appl. No.: 16/077,683

(22) PCT Filed: May 12, 2016

(86) PCT No.: PCT/US2016/031955
§ 371 (c)(1),
(2) Date: Aug. 13, 2018

(87) PCT Pub. No.: WO2017/196320
PCT Pub. Date: Nov. 16, 2017

(65) Prior Publication Data
US 2019/0055795 A1 Feb. 21, 2019

(51) Int. Cl.
*E21B 19/12* (2006.01)
*E21B 19/00* (2006.01)
*E21B 47/01* (2012.01)
*G01V 1/40* (2006.01)
*E21B 47/12* (2012.01)

(52) U.S. Cl.
CPC ............ *E21B 19/12* (2013.01); *E21B 19/008* (2013.01); *E21B 47/01* (2013.01); *E21B 47/123* (2013.01); *G01V 1/40* (2013.01)

(58) Field of Classification Search
CPC ........ E21B 19/12; E21B 19/008; E21B 47/01; E21B 47/123; E21B 23/00
See application file for complete search history.

(56) References Cited

U.S. PATENT DOCUMENTS 6,202,764 B1  3/2001 Ables et al.
7,963,319 B2  6/2011 Daigle et al.
(Continued)

OTHER PUBLICATIONS

CA Application Serial No. 3,018,506; Office Action; dated Jul. 26, 2019, 6 pages.
(Continued)

*Primary Examiner* — David J Bagnell
*Assistant Examiner* — Yanick A Akaragwe
(74) *Attorney, Agent, or Firm* — Gilliam IP PLLC

(57) ABSTRACT

A system for launching or retrieving wireline electro acoustic technology (EAT) sensor assemblies in a downhole wellbore comprises an EAT launcher/retriever section and an EAT sensor assembly for placement in the EAT launcher/retriever section. The EAT launcher/retriever section comprises an external high pressure housing, attachment means at each end of the external high pressure housing, and a wedge shaped internal retractable launcher plate with an opening on one side to allow a fiber based wireline cable to pass through the EAT launcher section. The EAT sensor assembly comprises a center section comprising sensors and two end sections, each end section with a set of extendable grippers to grip a fiber based wireline cable, wherein the center section and both end sections comprise a V groove that allows the EAT sensor assembly to be centered on the fiber based wireline cable.

20 Claims, 9 Drawing Sheets

(56) References Cited

U.S. PATENT DOCUMENTS

2007/0278435 A1   12/2007   Wood
2008/0230216 A1    9/2008   Angman
2011/0174503 A1    7/2011   Elsayed et al.

OTHER PUBLICATIONS

PCT Application Serial No. PCT/US2016/031955, International Search Report, dated Jan. 6, 2017, 3 pages.
PCT Application Serial No. PCT/US2016/031955, International Written Opinion, dated Jan. 6, 2017, 8 pages.

LAUNCHING AND RETRIEVING WIRELINE EAT SENSORS

BACKGROUND

Deployment of optical fiber using wireline techniques has become increasingly common for distributed acoustic sensing (DAS) and Distributed Temperature Sensing (DTS) systems. It is however desirable to have various other physical parameters measured along the well bore, and current retrievable logging systems may utilize point sensors at the distal end of the fiber based wireline cable where parameters are logged and data stored in a memory tool or communicated to the surface using optical fiber(s) or electrical conductors. The drawback with this approach is that only one point can be logged at any given time.

There is a need for an easily deployable system of distributed sensing for a variety of important parameters in downhole applications.

DETAILED DESCRIPTION

Figure 1:
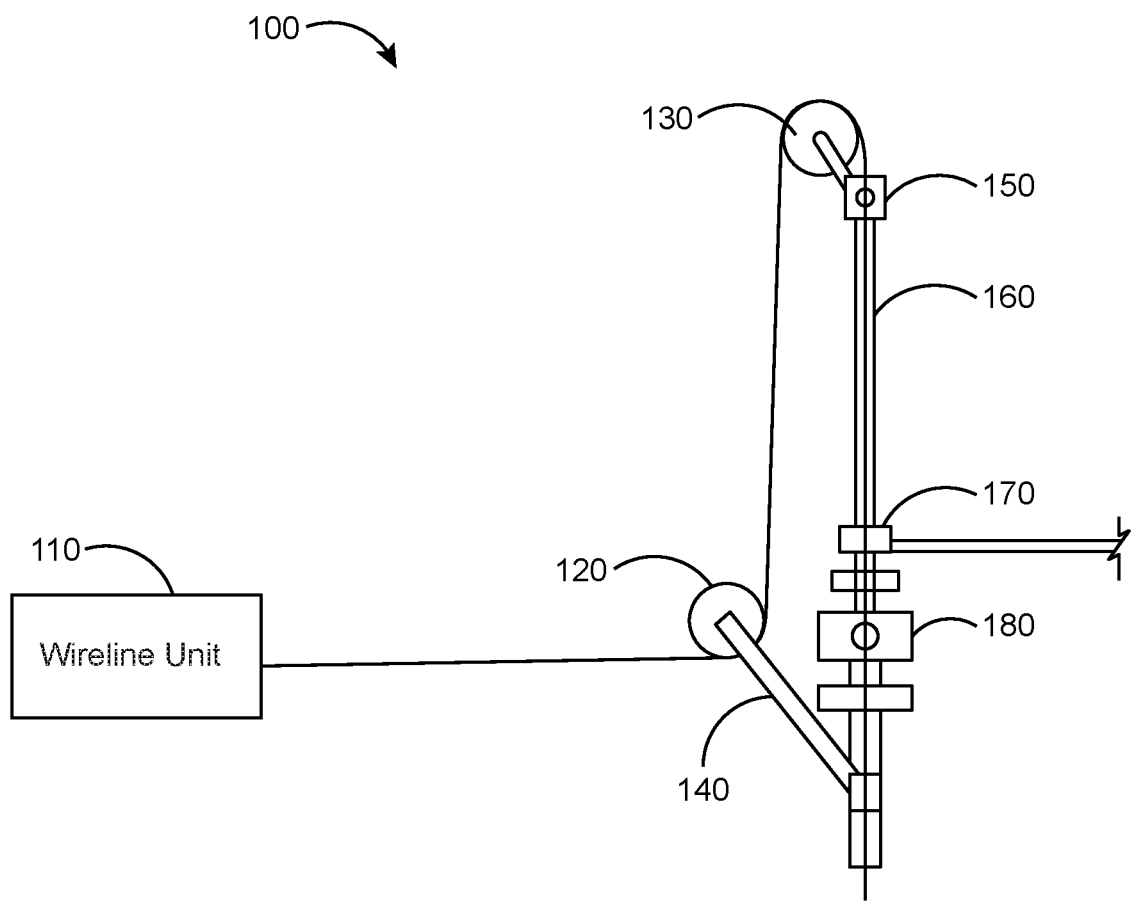
FIG. 1 illustrates a typical surface equipment configuration for rigging up a wireline.

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

Description of EAT (Electro Acoustic Technology) Sensors

The EAT sensors and EAT sensing technology described in this disclosure is a recently developed technology and has been described in a recently published PCT application: WO2015020642A1.

EAT sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber that is connected to an interrogator that may be located at the surface of a downhole well. The interrogator may routinely fire optical signal pulses downhole into the optical fiber. As the pulses travel down the optical fiber, back scattered light is generated and is received by the interrogator.

The perturbations or strains introduced to the optical fiber at the location of the various EAT sensors can alter the backpropagation of light, and those affected light propagations can then provide data with respect to the signal that generated the perturbations.

The possible advantages from using the above described EAT systems in a variety of configurations may include using a variety of sensors, either electrical or fiber optic based, to measure for example a chemical concentration, a pH, a temperature, or a pressure and using a common optical fiber connected to a surface interrogator to measure perturbation signals from each EAT sensor assembly location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

The proposed equipment consists of an EAT sensor assembly configured to clamp to, and unclamp from, fiber based wireline, and a modular launcher/retriever at the surface which enables one or multiple EAT sensor assemblies to be attached to the wireline anywhere along its length as required.

The fiber wireline consists of single or multiple optical fibers encased in a single metal tube or a metal tube with a multiple strand wire braided around the tube. A typical fiber tube is 0.125" diameter and the stranded version can be ¼ to ⅝" diameter, depending on loading requirements, although other diameters may be used. Some wirelines may also have a single insulated electrical conductor wire for powering equipment at the end of the fiber based wireline cable, such as a tractor for pulling the fiber based wireline cable in horizontal wells.

FIG. 1, shown generally as 100, illustrates a known configuration for surface equipment for rigging up wireline. It is mounted above the Christmas tree on a wellhead. It consists of a wireline unit 110 which spools off the wireline from a spool; a lower sheave 120 and upper sheave 130 maintained in tension by springs 140 to locate the wireline above the well head; a stuffing box 150 through which the wireline passes which provides the main seal on the wireline to prevent well pressure from leaking out; a lubricator section or tool trap 160 which also acts as storage for any tools that get lowered down the hole; a swab valve 170 and a master valve 180 which is used for shutting off well pressure so that the tooling can be removed. The lubricator is installed on top of the tree and tested, the tools placed in the lubricator and the lubricator pressurized to wellbore pressure. Then the top valves of the tree are opened to enable the tools to fall or be pumped into the wellbore under pressure. To remove the tools, the reverse process is used: the tools are pulled up into the lubricator section 160 under wellbore pressure, the tree valves are closed, the lubricator pressure is bled off, and then the lubricator section 160 may be opened to remove the tools.

Figure 2:
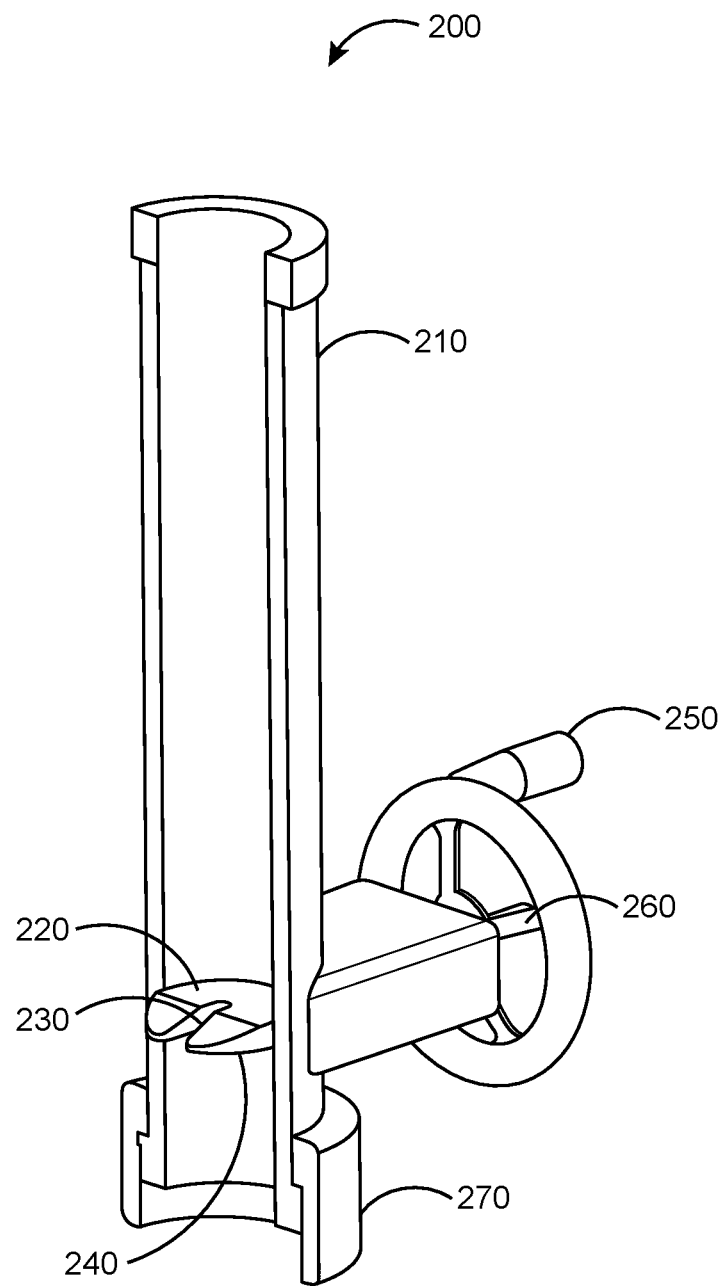
FIG. 2 illustrates a single EAT launcher section.

For the particular application proposed in this disclosure, the lubricator section 160 of FIG. 1 is replaced by a number of short length sections called EAT launchers (illustrated in FIG. 2, and shown generally as 200). Each EAT launcher section consists of an external high pressure housing 210, an attachment means 270 at both ends of the external high pressure housing, which could be a bolted flange or a high pressure coupling, and a retractable launcher plate 220, which is similar in operation to a knife gate valve, but is not used to seal pressure. Instead it holds an EAT sensor assembly in place and allows a fiber based wireline cable to pass through. It has a V-cut 230 to clear the fiber based wireline cable and a wedge shape 240 to push open or close retractable pins on the EAT sensor assembly. The EAT sensor assembly sits on top of the launcher plate. The length of the launcher pipe is the length of the EAT device plus the thickness of the launcher plate. Each EAT launcher contains one EAT sensor assembly. The stack of EAT launchers matches the number of EAT sensors required downhole. When the hand wheel 250 is rotated, the launcher plate is retracted from the bore. The rising stem 260 provides a visual indication of the launcher plate position since the stem and plate are connected and move together when the hand wheel is rotated.

Figure 3:
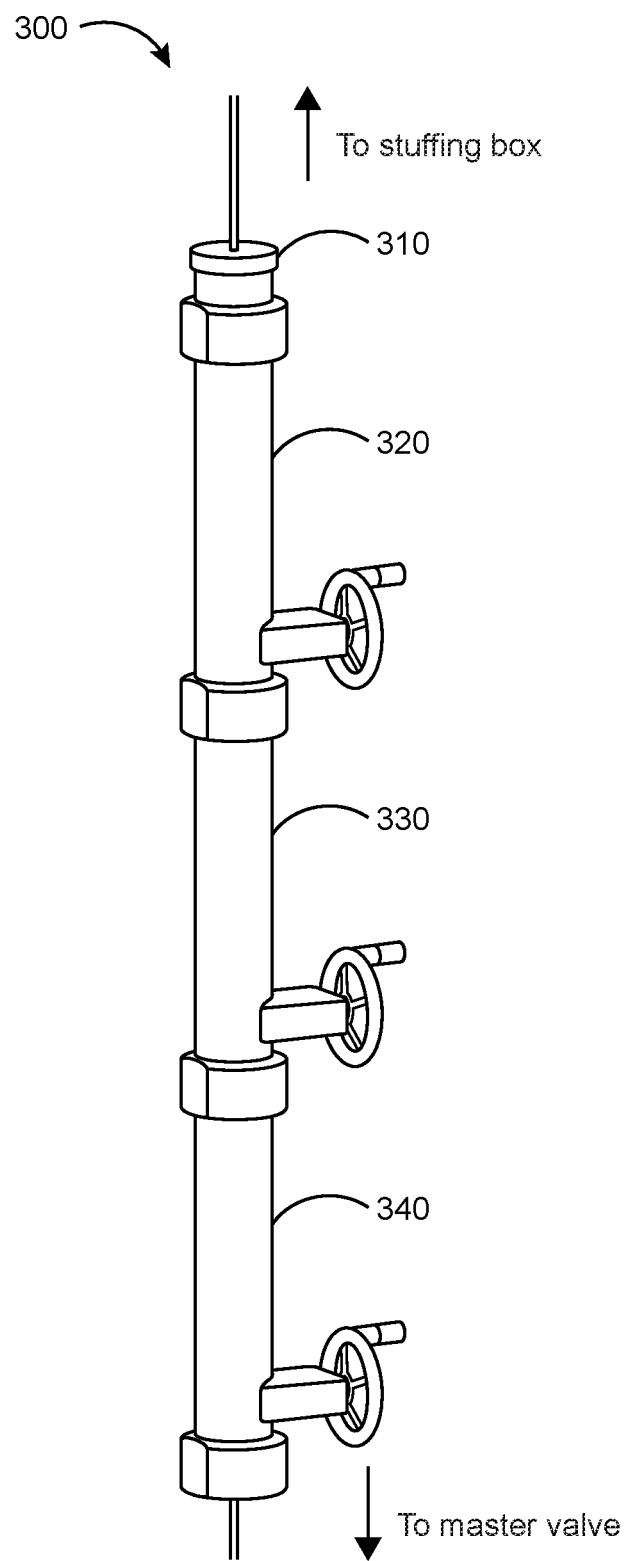
FIG. 3 illustrates a stack of EAT launchers.

The separate EAT launchers shown in FIG. 2 can then be stacked together and mounted above the tree valves. This is illustrated in FIG. 3, shown generally as 300. In this example three EAT launchers 320, 330, 340 are stacked and topped of with a top cap 310 which constrains the top EAT sensor assembly 320 and enables the stuffing box to be mounted. If instrumentation or equipment is mounted at the end of the wireline, then an additional lubricator or tool catcher can be mounted below the EAT launchers to contain the tools.

Figure 4:
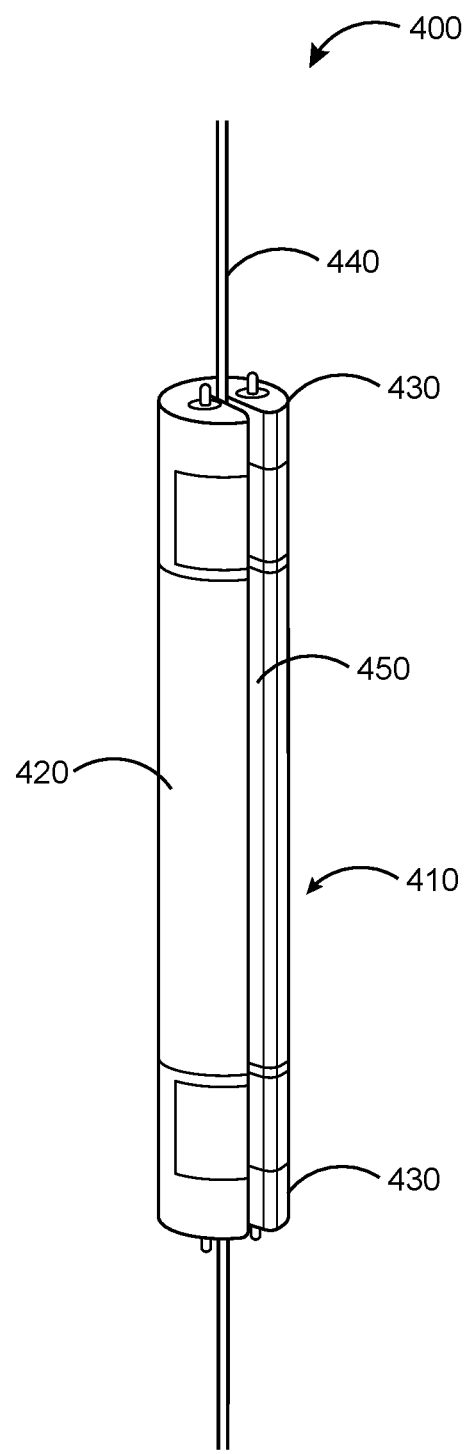
FIG. 4 illustrates an EAT sensor assembly.

The EAT sensor assembly is shown in FIG. 4, shown generally as 400. It consists of a center section that contains sensors, electronics, and batteries 410 in a pressure housing 420 and two identical end sections 430 that contain a set of extendable grippers (to be described) that grip the wireline fiber based wireline cable 440. The center and end sections have a V groove 450 in them that allow the sensor assembly to be centered on the wireline fiber based wireline cable 440.

Each end of the EAT sensor assembly is shown generally as 500. The end section 550 contains two identical grippers that consist of eccentric circular cams 510. The contact face of the grippers is recessed to match the diameter of the fiber based wireline cable 520. The cams are connected to spring loaded pins 530 that extend out the top 550 of the sensor assembly. In their normal state, the springs push the pin up, thus causing the cams 510 to extend into the space where the fiber based wireline cable is located, and make contact with the fiber based wireline cable 520. The contact surface of the cams may be high friction material, such as rubber, urethane or the like. When the pins are depressed by external means, the cams retract away from the fiber based wireline cable thus disconnecting the sensor assembly from the fiber based wireline cable.

Figure 6:
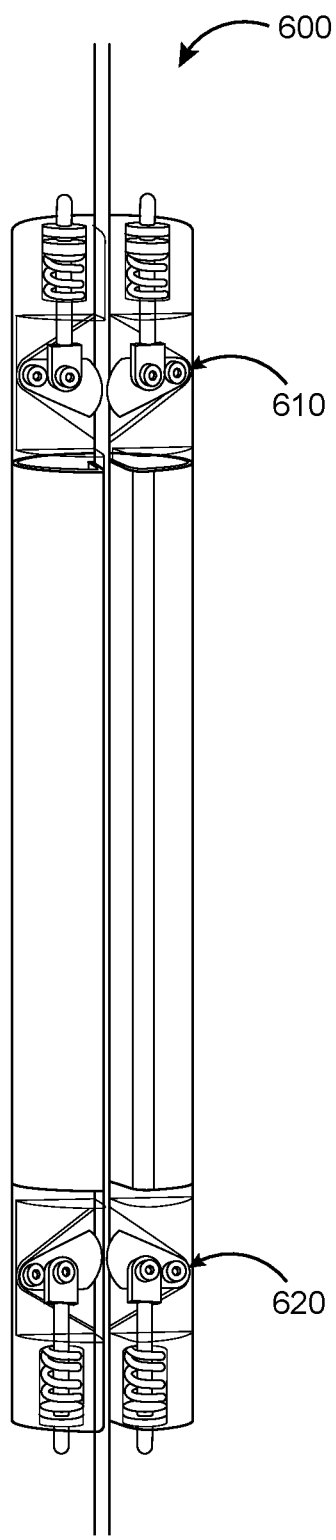
FIG. 6 illustrates a complete EAT sensor assembly that includes both an upper and lower set of cam grippers.

FIG. 6, shown generally as 600, illustrates a complete EAT sensor assembly that includes both an upper 610 and lower 620 set of cam grippers. The lower set of cams is a mirror copy of the upper set of cams that includes again two grippers with eccentric circular cams connected to spring loaded pins that extend out of the lower end of the sensor assembly so that the clamping force of the lower cams acts in the opposite direction from the upper cams.

The four cams of the upper and lower grip mechanisms work together to provide a very slip resistant and vibration resistant grip on the fiber based wireline cable. When forces try to pull the sensor assembly down on the fiber based wireline cable, the top set of cams are pulled tighter into the fiber based wireline cable. When the forces try to push the sensor assembly up on the fiber based wireline cable, the lower cams grip the fiber based wireline cable tighter. Together, the pairs of cams prevent any push or pulling on the sensor assembly to move it. Vibration only increases the grip.

Launch and Retrieval

In use, the EAT sensors can be launched as follows. The fiber based wireline cable is unwound to a preselected depth. The fiber based wireline cable is stopped. The lowest launcher plate is retracted, which causes the gripper pins to extend at both ends and the cams to grip the fiber based wireline cable. The fiber based wireline cable starts up again, taking the EAT with it.

The process is repeated for each EAT until all are deployed at their required positions.

Furthermore, in use the EAT sensor assemblies can be retrieved as follows. All launcher plates are retracted. The first EAT sensor assemblies returns to the top, where the top cap depresses the pins in the top of the EAT and disconnects the top cams to disconnect from the fiber based wireline cable. The lower end stays connected until the launcher plate is extended, even if the fiber based wireline cable continues to slip through the cam locks. The launcher plate is wedge shaped in section so that it pushes the pins into the housing as it is extended, and opens the cam locks. The EAT sensor assembly is now disconnected from the fiber based wireline cable at both ends and supported by the launch plate. The fiber based wireline cable can now continue to be retrieved.

The next EAT is stopped by the previously extended launcher plate, the spring loaded pins are compressed and the cams unlock from the fiber based wireline cable. The next lower launcher plate is extended and stores the EAT, and so on, until all EATs are retrieved.

An additional embodiment (not shown) that can be added is that If the EAT is still transmitting, a sonic detector could be added, or a secondary fiber mounted to the outside the EAT launcher to detect its location using the DAS interrogator. This would confirm that the EAT has reached its home position. Alternatively a Hall effect switch or similar could detect the presence of the EAT.

Acoustic transfer to the fiber based wireline cable.

Close coupling between the sensor assembly and the fiber based wireline cable is desired to ensure efficient transference of the acoustic signal to the fiber based wireline cable. This can be done by mounting the acoustic source directly in one of the locking cams. The source may be a piezo electric transducer (PET) or similar. Alternatively the PET can be mounted in the EAT enclosure close to the fiber based wireline cable, and a single cam may be used to push the fiber based wireline cable to provide good physical contact to an area designed to house the acoustic transducer used to communicate to the optical fiber inside the logging fiber based wireline cable.

Non Pressurized Installation

Figure 5:
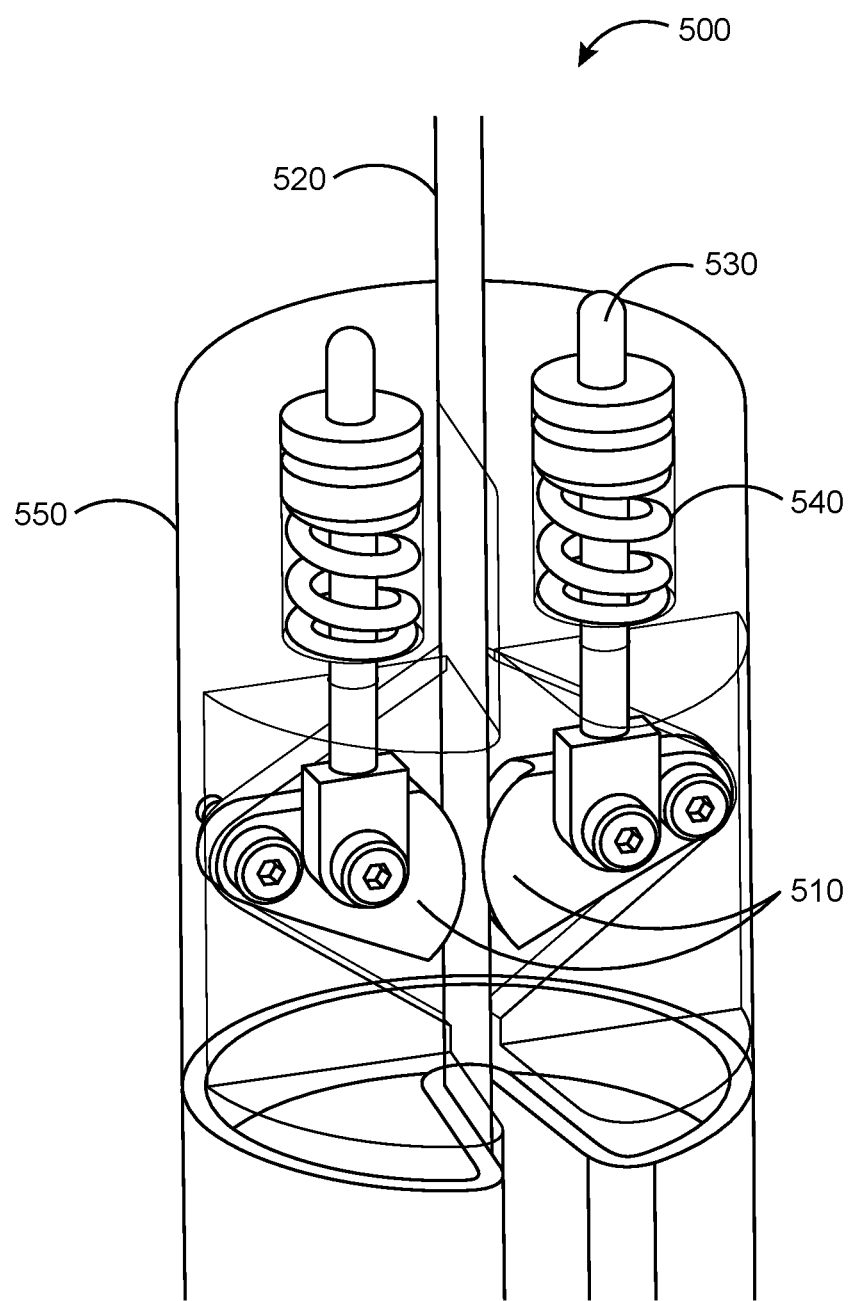
FIG. 5 illustrates one end section of an EAT sensor assembly as proposed in this disclosure.
Figure 7:
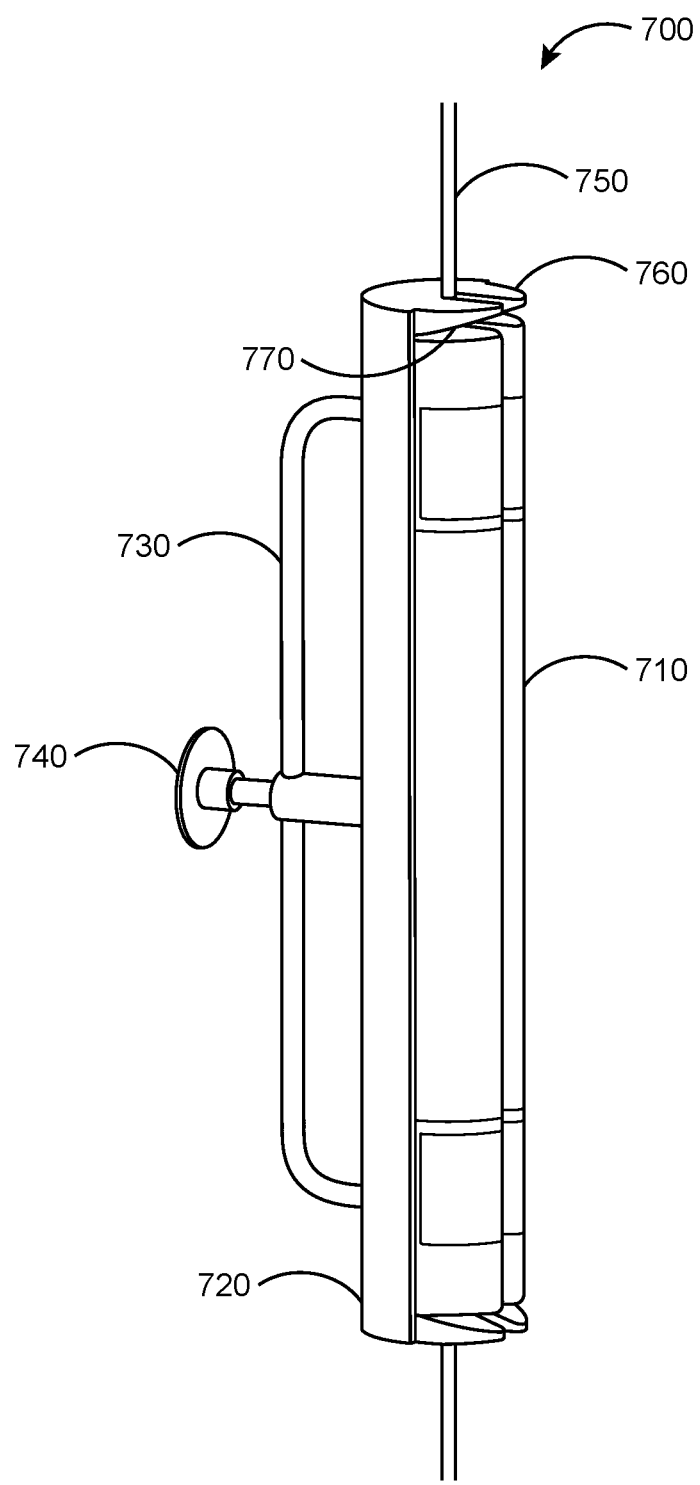
FIG. 7 illustrates a hand held fixture for use in non-pressurized installations.

A bridge plug may be deployed in the well to seal off the well bore pressure, and the area above the bridge plug will then not have any pressure beyond the hydrostatic pressure of any fluid in the well bore. Where a non-pressurized installation occurs, the pressurized EAT launcher can be replaced by a hand held fixture that holds the EAT sensor assembly with the pins (530 in FIG. 5) retracted, and thus with the cams open. This embodiment is illustrated in FIG. 7, shown generally as 700. The hand held open fixture 720, with handle 730 and plunger 740 holds the EAT sensor assembly 710. Top and bottom enclosures 760, 770 of the fixture keep the pins retracted while the EAT sensor assembly is contained within the hand held open fixture 720. The EAT sensor assembly 710 is placed up against the wireline 750 and pushed out of the hand held open fixture 720 with plunger 740. Once out of the fixture, the pins (530 in FIG. 5) extend which closes the cams on the wireline 750 and the EAT sensor assembly then rides downhole with the wireline. For retrieval, the same fixture is used in reverse to compress the pins and remove the EAT sensor assembly.

Addition of a Locking Arm

Figure 8:
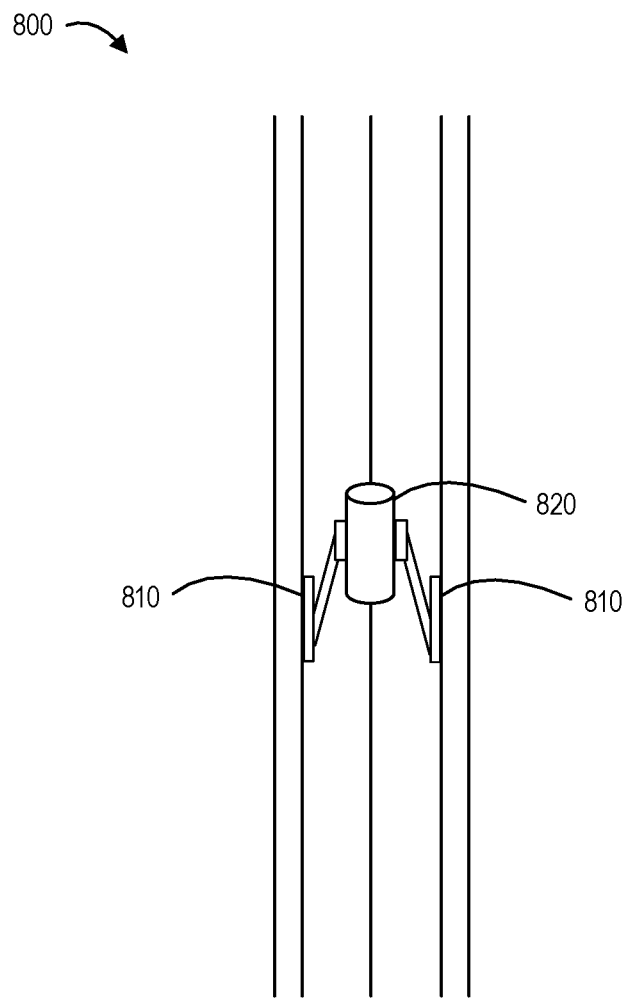
FIG. 8 illustrates an example of securing an EAT sensor package to an inner wall of a casing with a locking arm.

There are some applications, primarily seismic/microseismic applications and some logging operations in which it might be critical to have good contact of the EAT sensor package with the inner wall of the casing after it has reached its desired location. It has been shown that this can be accomplished by use of a locking arm that pushes the EAT sensor package against the inner wall of the casing. This embodiment is illustrated in FIG. 8, shown generally as 800, which depicts a locking arm 810 and an EAT sensor package 820. The locking arm can be spring loaded to ensure reliable contact. There are a number of configurations of locking arms that can be used. These could be installed on the outside of the EAT sensor package and activated to deploy into a locked position against the casing wall once the EAT sensor is located at its desired position. Mechanical/hydraulic forces from the surface could initiate activation, avoiding the use of electronic control circuitry or electrical power and wiring, allowing for reliable use in temperature environments where electronics have a high risk of failure.

Value Added Utility

Figure 9:
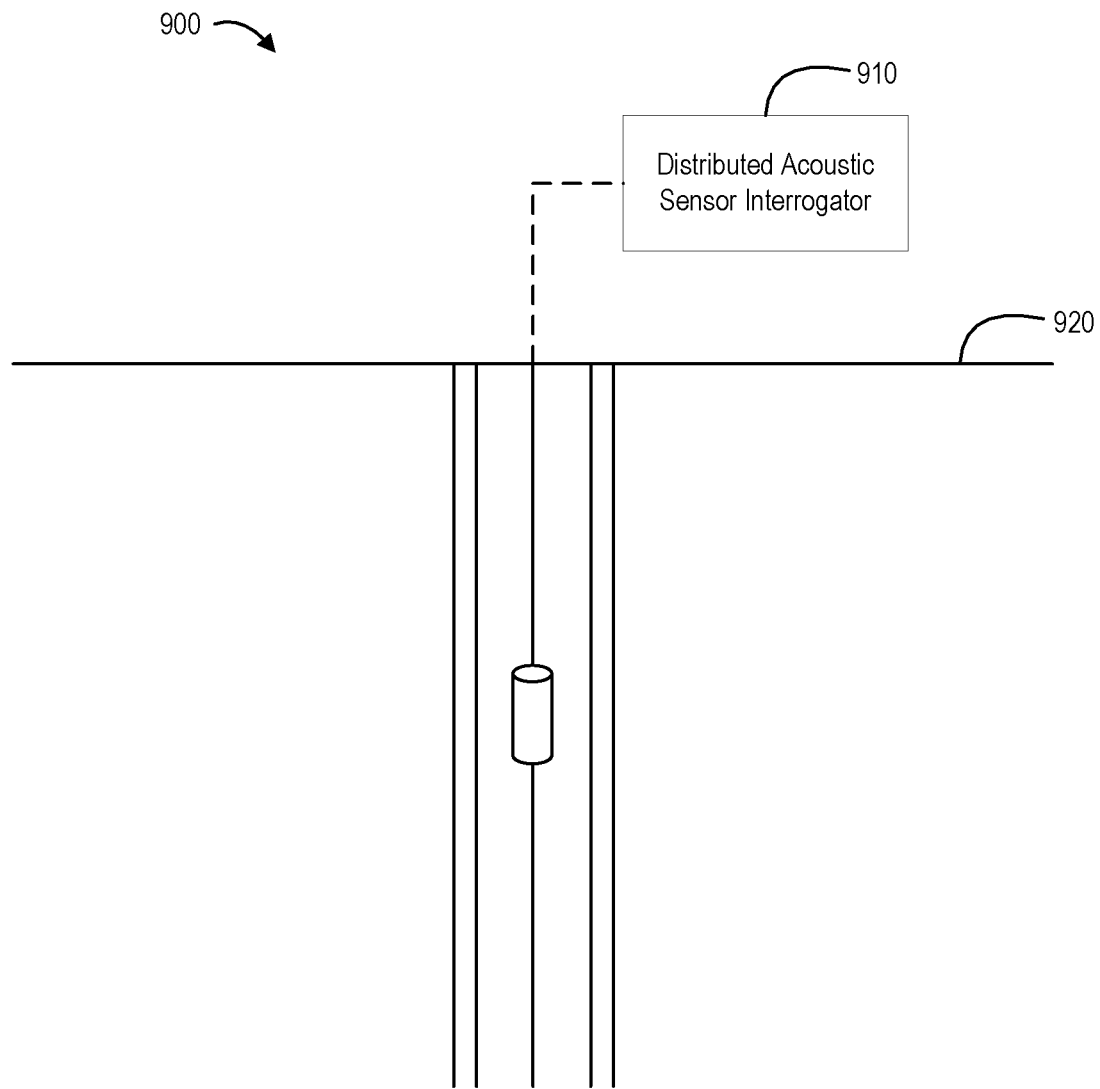
FIG. 9 illustrates an example of leveraging an EAT sensor assembly for detection of acoustic signals by a distributed acoustic sensor (DAS) interrogator at the surface.

The system and method described herein allows for simultaneous deployment of multiple point sensors deployed along a logging fiber based wireline cable to provide real-time data. The system may use electro acoustic technology (EAT) sensors that provide point measurement of oil well parameters such as pressure and temperature (e.g., seismic sensors) with locking arms to couple to the casing wall/formation. The sensors can then be positioned as desired along the well and said logging fiber based wireline cable. This embodiment is illustrated in FIG. 9, shown generally as 900. The EAT sensors use the DAS fiber as a data transmission line by converting electrical signals to acoustic signals which excite the fiber and can be detected by an interrogator 910 at a surface 920. The fiber acts as both a sensor for continuous monitoring over the entire length of the well, as well as a transmission method for point sensing. Attaching the EAT sensors reliably to the fiber based wireline cable and launching them downhole requires novel equipment and methods which are described herein. Similarly, detaching the EAT sensor from the fiber based wireline cable and storing the EAT upon retrieval is also described, using the same apparatus. A hand held version for unpressurized wellheads is also described.

The system and method described herein adds point measurement capability to DAS for dip ins, wireline monitoring of seismic, pressure, temperature, flow, etc. with real time display. The proposed solution will enable sensing, such as micro-seismic sensing, in high temperature environment where some current tools fail given that some electronic boards (A/D converters, data acquisition boards, telemetry circuits etc.) can be limited in their ability limited temperatures. The proposed EAT technology can be built using high temperature electronics. The cost of this system will also be much lower given the reduction of down-hole electronics, and the reliability will improve over existing micro-seismic systems as there is no need to cut the fiber based wireline cable to manufacture connections suitable for down-hole deployment. The system will also be configurable on the fly to meet different well configurations.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system comprising:
   an electro acoustic technology (EAT) launcher/retriever section comprising,
      an external high pressure housing;
      attachment means at each end of the external high pressure housing; and
      a wedge shaped internal retractable launcher plate with an opening on one side to allow a fiber based wireline cable is to pass through the EAT launcher section; and
   an EAT sensor assembly for placement in the EAT launcher/retriever section comprising,
      a center section comprising sensors; and
      two end sections, each comprising a set of extendable grippers to grip a fiber based wireline cable,
      wherein the center section and both end sections comprise a V groove that allow the EAT sensor assembly to be centered on the fiber based wireline cable.

2. The system of claim 1, wherein the attachment means at each end of the external high pressure housing of the EAT launcher section comprises at least one of a bolted flange and a high pressure coupling.

3. The system of claim 1 further comprising a mechanism to retract the wedge shaped internal retractable launcher plate.

4. The system of claim 1 further comprising a surface distributed acoustic sensor (DAS) interrogator, wherein the surface DAS interrogator detects and interprets acoustic signals from the fiber based wireline cable.

5. The system of claim 1, wherein the end sections of the EAT launcher/retriever section comprise grippers, wherein the grippers comprise eccentric circular cams with contact faces recessed to match the diameter of the fiber based wireline cable, wherein the eccentric circular cams are connected to spring loaded pins that, when extended out of the end sections of the EAT launcher/retriever section, activate the eccentric circular cams to close onto the fiber based wireline cable.

6. The system of claim 1, further comprising a locking arm attached on the outside of the EAT sensor assembly, wherein the locking arm is activated to deploy into a locked position against a casing wall of a downhole well bore.

7. The system of claim 1, wherein the opening in the wedge shaped internal retractable launcher plate comprises a v-cut.

8. A system comprising:
   a hand held open fixture;
   an electro acoustic technology (EAT) sensor assembly for placement in the hand held open fixture comprising, a center section comprising sensors; and
two end sections, each with extendable grippers to grip a fiber based wireline cable, wherein the extendable grippers comprise eccentric circular cams with contact faces recessed to match the diameter of the fiber based wireline cable, and wherein the eccentric circular cams are connected to spring loaded pins that extend out of the end sections of the EAT sensor assembly,
wherein the center section and both end sections comprise a V groove that allows the EAT sensor assembly to be centered on the fiber based wireline cable;
top and bottom plates on the hand held open fixture, each comprising a V groove that allows the hand held open fixture to be centered on the fiber based wireline cable;
a handle to place the EAT sensor assembly against the fiber based wireline cable; and
a plunger to push the EAT sensor assembly out of the hand held open fixture, allowing the spring loaded pins to extend out of the end sections of the EAT sensor assembly and cause the eccentric circular cams to close onto the fiber based wireline cable.

9. The system of claim 8, further comprising a locking arm attached on the outside of the EAT sensor assembly, wherein the locking arm is activated to deploy into a locked position against a casing wall of a downhole well bore.

10. The system of claim 8 further comprising a surface distributed acoustic sensor (DAS) interrogator, wherein the surface DAS interrogator detects and interprets acoustic signals from the fiber based wireline cable.

11. A method for launching and retrieving wireline electro acoustic technology (EAT) sensors in a downhole hydrocarbon well bore, wherein the launching comprises:
mounting one or more EAT launcher/retriever sections on a wellhead, the EAT launcher/retriever sections comprising,
an external high pressure housing;
attachment means at each end of the external high pressure housing;
a wedge shaped internal retractable launcher plate with an opening on one side to allow a fiber based wireline cable to pass through the one or more EAT launcher sections; and
each one or more EAT launcher/retriever sections having an installed EAT sensor assembly comprising,
a center section comprising sensors; and
two end sections, each with extendable grippers for gripping the fiber based wireline cable, wherein the extendable grippers comprise eccentric circular cams with contact faces recessed to match the diameter of the fiber based wireline cable, and wherein the eccentric circular cams are connected to spring loaded pins that extend out of the end sections of the EAT sensor assembly,
wherein the center section and both end sections comprise a V groove that allow the EAT sensor assembly to be centered on the fiber based wireline cable;
unwinding the fiber based wireline cable downhole to a preselected depth;
retracting the wedge shaped internal retractable launcher plate of the lowest EAT launcher/retriever sections, causing the spring loaded pins to extend out of the end sections of the EAT sensor assembly, resulting in allowing the extendable grippers to grip the fiber based wireline cable; and
restarting the unwinding of the fiber based wireline cable, taking the installed EAT sensor assembly from the lowest EAT launcher/retriever section.

12. The method of claim 11, wherein the retrieving comprises:
retracting the wedge shaped internal retractable launcher plates;
re-winding the fiber based wireline cable toward a surface until the EAT sensor assembly returns to the topmost EAT launcher/retriever section;
re-inserting the wedge shaped internal retractable launcher plate of the topmost EAT launcher/retriever section, pushing the spring loaded pins back into the EAT sensor assembly and disconnecting the EAT sensor assembly from the fiber based wireline cable; and
continuing to re-wind the fiber based wireline cable toward the surface, capturing each EAT sensor assembly in the EAT launcher/retriever section and re-inserting each wedge shaped internal retractable launcher plate until the EAT sensor assemblies are retrieved.

13. The method of claim 11, wherein the attachment means at each end of the external high pressure housing comprises at least one of a bolted flange and a high pressure coupling.

14. The method of claim 11, further comprising detecting and interpreting the acoustic signals from the fiber based wireline cable.

15. The method of claim 11, wherein the opening in the wedge shaped internal retractable launcher plate comprises a v-cut.

16. The method of claim 11, further comprising repeating the unwinding, the retracting, and the restarting until additional EAT sensor assemblies are deployed at other positions downhole.

17. The method of claim 16, further comprising retrieving the EAT sensor assembly and the additional EAT sensor assemblies, wherein the retrieving comprises:
re-winding the fiber based wireline cable toward the surface until the EAT sensor assembly returns to the surface;
pushing a hand held open fixture over the EAT sensor assembly to enclose the EAT sensor assembly and to compress the spring loaded pins that extend out of the end sections of the EAT sensor assembly, thus releasing the grip of the extendable grippers on the fiber based wireline cable;
removing the EAT sensor assembly from the hand held open fixture; and
repeating for each of the additional EAT sensor assemblies.

18. A method for launching and retrieving wireline electro acoustic technology (EAT) sensors in a downhole hydrocarbon well bore in a non-pressurized installation, wherein the launching comprises:
using a hand held open fixture for holding an EAT sensor assembly;
placing the EAT sensor assembly in the hand held open fixture, the EAT sensor assembly comprising,
a center section comprising a sensor; and
two end sections, each with extendable grippers to grip a fiber based wireline cable, wherein the extendable grippers comprise eccentric circular cams with contact faces recessed to match the diameter of the fiber based wireline cable, and wherein the eccentric circular cams are connected to spring loaded pins that extend out of the end sections of the EAT sensor assembly, wherein the center section and both end sections comprise a V groove that allows the EAT sensor assembly to be centered on the fiber based wireline cable, and wherein the spring loaded pins are held in a retracted position so that the extendable grippers are gripping the fiber based wireline cable;

unwinding the fiber based wireline cable downhole to a preselected depth;

placing the hand held open fixture and EAT sensor assembly against the fiber based wireline cable so that the fiber based wireline cable is centered in the V groove of the EAT sensor assembly;

pushing the EAT sensor assembly out of the hand held open fixture to cause the spring loaded pins to extend out of the end sections of the EAT sensor assembly, resulting in allowing the extendable grippers to grip the fiber based wireline cable; and restarting the unwinding of the fiber based wireline cable to move the installed EAT sensor assembly further downhole.

19. The method of claim 18, further comprising repeating the unwinding, the placing of the hand held open fixture and EAT sensor assembly against the fiber based wireline, and the restarting until additional EAT sensor assemblies are deployed at other positions downhole.

20. The method of claim 18, further comprising detecting and interpreting the acoustic signals from the fiber based wireline cable.

* * * * *